Figure 1:
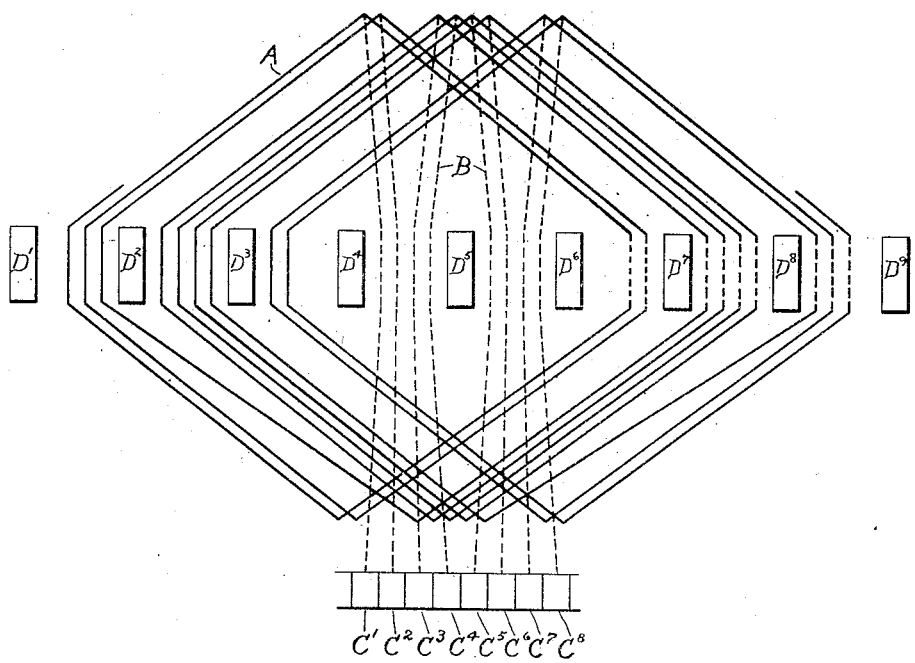

No. 861,072. PATENTED JULY 23, 1907.
E. F. W. ALEXANDERSON.
DYNAMO ELECTRIC MACHINE.
APPLICATION FILED JAN. 12, 1907.

2 SHEETS—SHEET 1.

WITNESSES:
Lester H. Fulmer.
J. Ellis Glen

INVENTOR
ERNST F. W. ALEXANDERSON.
BY Albert G. Davis
ATTY.

No. 861,072. PATENTED JULY 23, 1907
E. F. W. ALEXANDERSON.
DYNAMO ELECTRIC MACHINE.
APPLICATION FILED JAN. 12, 1907.

2 SHEETS—SHEET 2.

WITNESSES:
Lester H. Fulmer.
J. Ellis Glen.

INVENTOR
ERNST F. W. ALEXANDERSON.
BY Albert G. Davis
ATTY.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

DYNAMO-ELECTRIC MACHINE.

No. 861,072.         Specification of Letters Patent.         Patented July 23, 1907.

Application filed January 12, 1907. Serial No. 351,953.

*To all whom it may concern:*

Be it known that I, ERNST F. W. ALEXANDERSON, a subject of the King of Sweden, residing at Schenectady, county of Schenectady, State of New York, have invented certain new and useful Improvements in Dynamo-Electric Machines, of which the following is a specification.

My invention relates to dynamo-electric machines of the commutator type and its object is to provide a novel arrangement of commutator coils and leads, such that better commutation can be secured in a machine having more than two coils per slot than could be secured with former arrangements.

My invention is particularly advantageous when employed in alternating-current machines, since the commutation difficulties are greater in such machines, owing to the current induced in the short-circuited coils by the pulsating field, than in direct-current machines.

In direct-current machines coil-reactance is a disadvantageous factor, since it opposes rapid reversal of current in a coil as it passes under a brush in commutation. In alternating-current machines, however, a certain amount of reactance is required for satisfactory commutation in order to limit the amount to which the current induced in the short-circuited coil by the pulsating field may rise. In both types of machines the leakage-reactance between any two adjacent coils should be the same in order to secure the best results. If each pair of adjacent coils could occupy the same slots, so that there would be no leakage-reactance between them, then theoretically one of the coils could be cut out of circuit, and the other cut in without any sparking whatever, since the mutual induction would be perfect and for direct-current commutation this would be an ideal condition; but since the armature coils must progress in position around the armature, it is obvious that there must be a certain leakage-reactance between coils. If only one coil per slot is employed, this reactance is distributed equally between adjacent pairs of coils, but where more than one coil per slot is used, this is not the case, unless special arrangements are resorted to for securing the equal distribution of reactance. For instance, if two coils per slot are employed, and are placed in pairs in successive slots,—that is, if coils A and B are placed in the same slots, and coils C and D are displaced from coils A and B by one tooth at each side of the coils, then the leakage-reactance between coils A and B is exceedingly small, while the leakage-reactance between coils C and D is considerable, owing to the fact that each coil overlaps the other by one tooth at each end. Such an arrangement produces poor commutation. When only two coils per slot are used, equality of leakage-reactance can be secured by so arranging coils A and B that one side of coil B lies in the same slot with one side of coil A, while the other side of coil B is separated by a tooth from the other side of coil A, and placing coil C with one side in the same slot with the side of coil B that is displaced from coil A, and with its other side in a slot displaced by one tooth from the slot occupied by both coils A and B. With this arrangement, there is a leakage-reactance between each pair of coils, due to the flux in one tooth. This arrangement alone, which has been employed heretofore, suffices only when not more than two coils per slot are employed.

The object of my invention is to render it possible to secure the same equality of reactance distribution when more than two coils per slot are used. I accomplish this by so arranging the commutator leads that a leakage-reactance is introduced between the leads of the coils which lie in the same slots and consequently would otherwise have no leakage-reactance; while the leads which are connected to coils which lie in part in different slots are arranged to have no leakage-reactance between them. By extending the leads once through the armature I am enabled to obtain equal leakage-reactance with four coils per slot, and by extending the leads twice through the armature I can obtain equal leakage-reactance with six coils per slot.

Figure 2:
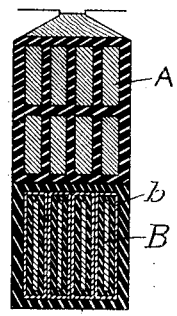
Figure 3:
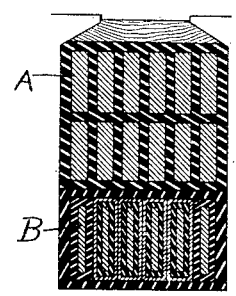
Figure 4:
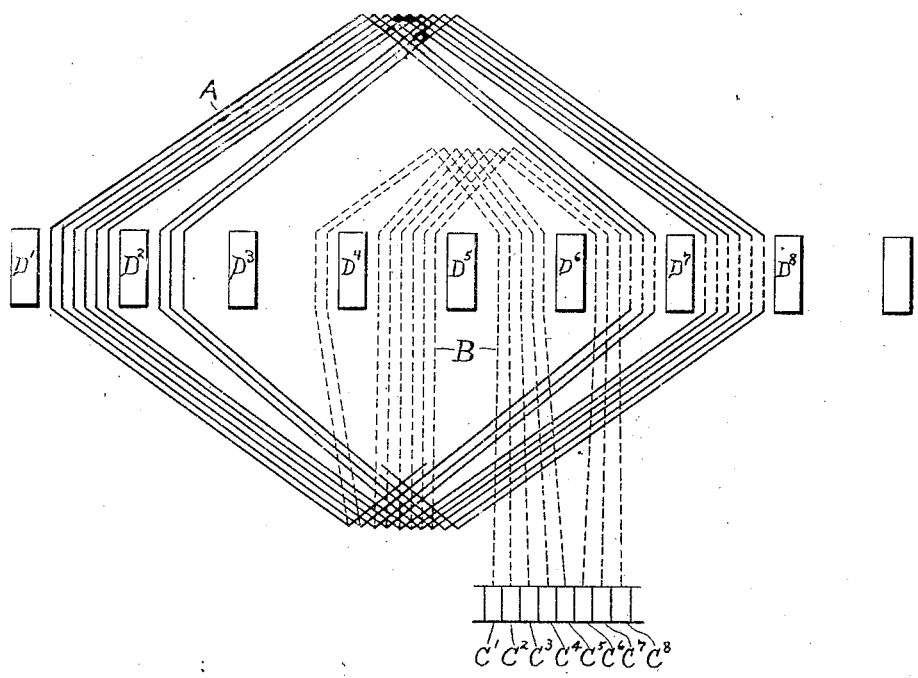
Figure 5:
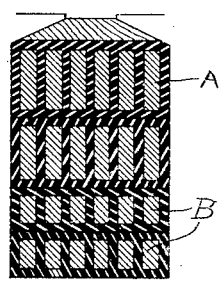

My invention will best be understood by reference to the accompanying drawings, in which Figure 1 shows diagrammatically a development on a plane surface of a portion of an armature winding arranged in accordance with my invention; Fig. 2 shows a cross-sectional view of the conductors and leads in an armature slot; Fig. 3 shows a modification of the same; Fig. 4 shows a diagrammatic development of a portion of an armature winding in which the leads cross the armature twice; and Fig. 5 shows a cross-sectional view of the conductors and leads in an armature slot.

In Fig. 1, A represents the armature coils, B the commutator leads which are preferably of high resistance, and $C^1$, $C^2$, etc., the commutator segments. $D^1$ to $D^9$ represent the teeth of the armature core. The coils A and leads B are placed in the slots between these teeth. In Fig. 1 four coils per slot are shown, and the coils and leads are so arranged that the leakage-reactance between each pair of coils is the same. That this is the case will be seen by tracing the circuits formed by adjacent coils and their leads. For instance, starting from commutator segment $C^1$, the circuit passes through the commutator lead between teeth $D^4$ and $D^5$, then through the coil conductor between teeth $D^1$ and $D^2$, then through the coil conductor between teeth $D^6$ and $D^7$, and through a commutator lead between teeth $D^4$ and $D^5$ to commutator segment $C^2$. Now, tracing the circuit between commutator segments $C^2$ and $C^3$, it will be seen that it passes first between teeth $D^4$ and $D^5$, then between teeth $D^1$ and $D^2$, then between teeth $D^7$ and $D^8$, and between teeth $D^4$ and $D^5$ to commutator segment $C^3$. Comparing the two circuits thus traced, it will be seen that all the corresponding conductors of the two circuits lie in the same slots, with the exception of the right-hand coil conductors; of which one lies between teeth $D^6$ and $D^7$, and the other between teeth $D^7$ and $D^8$. Consequently there is a leakage-reactance between these two circuits due to the flux in the tooth $D^7$. Now, tracing the circuit between commutator segments $C^3$ and $C^4$, it will be seen that it passes between teeth $D^4$ and $D^5$, between teeth $D^2$ and $D^3$, between teeth $D^7$ and $D^8$, and between teeth $D^4$ and $D^5$ to commutator segment $C^4$. Comparing this circuit with that traced between commutator segments $C^2$ and $C^3$, it will be seen that all the corresponding conductors of the two circuits lie in the same slots, with the exception of the left-hand coil conductors, which are separated by the tooth $D^2$. Consequently, there is a leakage-reactance between these two circuits, due to the flux in the tooth $D^2$. Now, tracing the circuit between commutator segments $C^4$ and $C^5$, it will be seen that it passes between teeth $D^4$ and $D^5$, between teeth $D^2$ and $D^3$, between teeth $D^7$ and $D^8$, and between teeth $D^5$ and $D^6$. Comparing this circuit with the circuit between commutator segments $C^3$ and $C^4$, it will be seen that all the corresponding conductors of the two circuits lie in the same slots, with the exception of the return leads, which are separated by the tooth $D^5$. Consequently, there is a leakage-reactance between these circuits, due to the flux in tooth $D^5$. Lastly, tracing the circuit from commutator segment $C^5$ to segment $C^6$, it will be seen that it passes between teeth $D$ and $D^6$, between teeth $D^2$ and $D^3$, between teeth $D^7$ and $D^8$, and between teeth $D^5$ and $D^6$. Comparing this circuit with that between segments $C^4$ and $C^5$, it will be seen that all corresponding coil conductors in the two circuits lie in the same slots, with the exception of the entering leads, which are separated by the tooth $D^5$. Consequently, between these two circuits there is a reactance due to the flux in the one tooth $D^5$. Thus, there is between each pair of adjacent coils a leakage-reactance due to the flux in one tooth, so that the leakage-reactance is uniformly distributed.

In Fig. 2 the coil conductors and leads are shown in cross-section. I have also shown around each lead B a closed magnetic circuit $b$, which may be formed of an iron lamina bent around the lead and insulated from it. The purpose of these laminæ is to increase the reactance of each lead, if such increase is required for the best results in commutation. Even if these laminæ are employed, they need not be placed around the outer leads, since these leads are separated from those in the next slot by a tooth. Thus, in Fig. 3 I have shown the laminæ applied only to the central leads.

The arrangement heretofore described, with the leads extending once through the armature, suffices to secure equal reactance distribution for four coils per slot, but if it is desired to use more coils per slot, the arrangement shown in Fig. 4 may be resorted to. In this figure, six coils per slot are shown, and the leads B are extended twice across the armature. The circuits of the coils and leads may be traced in the same manner as in Fig. 1. Thus, the circuit between segments $C^1$ and $C^2$ passes between teeth $D^5$ and $D^6$, $D^3$ and $D^4$, $D^1$ and $D^2$, $D^6$ and $D^7$, $D^3$ and $D^4$, $D^5$ and $D^6$, to segment $C^2$. The circuit from segment $C^2$ to $C^3$ may be traced between teeth $D^5$ and $D^6$, $D^3$ and $D^4$, $D^1$ and $D^2$, $D^6$ and $D^7$, $D^4$ and $D^5$, $D^5$ and $D^6$. By comparing these two circuits, it will be seen that all the corresponding conductors of the two circuits lie in the same slots, with the exception of portions of the return leads. These return leads, parts of both of which lie between teeth $D^5$ and $D^6$, are separated in another part of their length by the teeth $D^4$, so that there is a leakage-reactance between the two circuits, due to the flux in tooth $D^4$. Similarly, by tracing the remaining circuits, it will be seen that in each case between each pair of adjacent coil circuits, there is a leakage-reactance due to the flux of one tooth. In some cases this is due to the displacement by one tooth of the conductors forming one side of the coils. In other cases it is due to a displacement between portions of the commutator leads. Some of the leads, which lie together in one slot, are separated in other slots in another portion of their length, and the leads which lie together throughout their lengths are connected to coils which lie in part in different slots.

In Fig. 5 the coil conductors and leads in a slot are shown in cross-section.

The principles which I have disclosed above, may be applied to other arrangements of coils and to different numbers of coils per slot. Accordingly, I do not desire to limit myself to the particular arrangement of coils and leads shown and described, but aim in the appended claims to cover all modifications which are within the scope of my invention.

What I claim as new and desire to secure by Letters Patent of the United States, is,—

1. In a dynamo-electric machine, a slotted armature, an armature winding having more than two coils per slot, a commutator, and leads connecting the coils to the commutator, the coils and leads being arranged to produce equal leakage-reactances between the circuits formed by any two adjacent coils and their leads.

2. In a dynamo-electric machine, a slotted armature, an armature winding having a plurality of coils per slot, a commutator, and leads carried in the slots connecting the coils to the commutator, a portion of the coils having one side in the same slot being arranged with their other sides separated in different slots and the leads from the coils not so separated being arranged in different slots.

3. In a dynamo-electric machine, a slotted armature, an armature winding having more than two coils per slot, a commutator, and leads connecting the coils to the commutator, a portion of the coils having one side in the same slot being arranged with their other sides separated in different slots and the leads from the coils not so separated being separated from each other by magnetic material.

4. In a dynamo-electric machine, a slotted armature, an armature winding having more than two coils per slot, a commutator, and leads carried in the slots connecting the coils to the commutator, the coil conductors and leads being distributed in the slots to produce equal leakage-reactances between the circuits formed by any two adjacent coils and their leads.

5. In a dynamo-electric machine, a slotted armature, an armature winding having more than two coils per slot, a commutator, and leads connecting the coils to the commutator, each lead extending through a plurality of slots, some of the leads which lie together in one slot being separated in other slots in another portion of their lengths, and the leads which lie together throughout their lengths being connected to coils which lie in part in different slots.

6. In a dynamo-electric machine, a slotted armature, an armature winding having more than two leads per slot, a commutator, and leads connecting the coils to the commutator, each extending through a plurality of slots, the coil conductors and the leads being distributed in the slots to produce equal leakage-reactances between the circuits formed by any two adjacent coils and their leads.

7. In a dynamo-electric machine, a slotted armature, an armature winding having more than two coils per slot, a commutator, and leads carried in the slots connecting the coils to the commutator, some of the leads which lie in different slots being connected to coils lying in the same slots and leads which lie in the same slots being connected to coils which lie in part in different slots.

In witness whereof, I have hereunto set my hand this 10th day of January, 1907.

ERNST F. W. ALEXANDERSON.

Witnesses:
BENJAMIN B. HULL,
HELEN ORFORD.